United States Patent [19]

Bosse

[11] Patent Number: 4,539,475
[45] Date of Patent: Sep. 3, 1985

[54] TEMPERATURE COMPENSATION SYSTEM FOR A PRISM IN AN OPTICAL TRANSDUCER

[75] Inventor: Thomas W. Bosse, New Milford, Conn.

[73] Assignee: Pitney Bowes Inc., Stamford, Conn.

[21] Appl. No.: 474,778

[22] Filed: Mar. 14, 1983

[51] Int. Cl.³ .............................................. G01L 1/24
[52] U.S. Cl. ................... 250/231 P; 350/286; 356/137; 73/705; 73/708
[58] Field of Search ........................ 250/231 R, 231 P; 350/112, 286; 356/135–137, 32–34; 177/DIG. 3, DIG. 6; 73/705, 763, 765, 766, 800, 708

[56] References Cited

U.S. PATENT DOCUMENTS 3,267,795  8/1966  Goldberg .......................... 356/137
4,322,979  4/1982  Fromm ................................ 73/705

Primary Examiner—Edward P. Westin
Attorney, Agent, or Firm—Peter Vrahotes; William D. Soltow, Jr.; Albert W. Scribner

[57] ABSTRACT

A system that provides temperature compensation in an optical transducer that uses a prism for the purpose of determining a load applied thereto and which may be used to find the weight of an object. When material such as plastic, glass, crystal and the like experiences a change in temperature, its index of refraction changes. By combining prisms, compensation may be made for the change of temperature.

7 Claims, 4 Drawing Figures

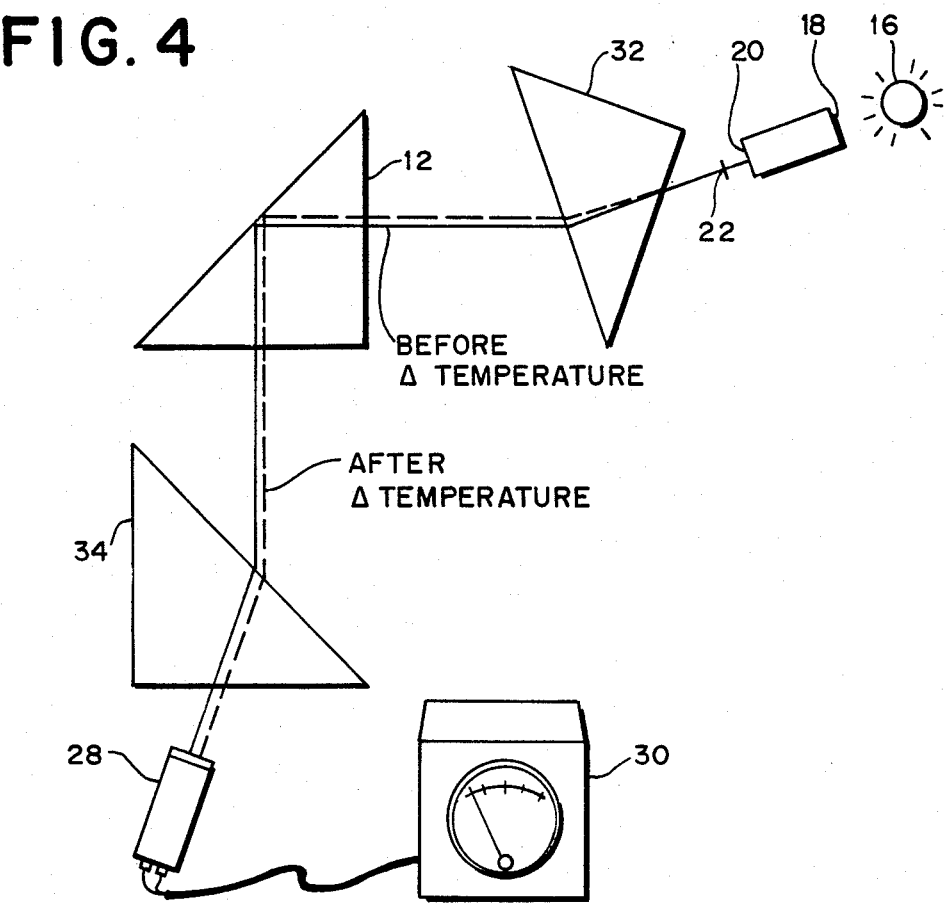

TEMPERATURE COMPENSATION SYSTEM FOR A PRISM IN AN OPTICAL TRANSDUCER

BACKGROUND OF THE INVENTION

In the field of weighing scales, one is constantly seeking a scale that will be reliable over a broad range, durable, and inexpensive to manufacture and maintain. Many different types of weighing scales have been used in the past including spring scales, scales with vibrating strings, piezoelectric devices (load cells) and others. As one would expect, each of these scales has its unique advantages and disadvantages. Spring scales have not been found to be highly accurate for small weights. Scales utilizing a vibrating string are too dependent on the characteristic of the material from which the string is made and load cell scales generally have to be designed for specific weight ranges. In addition, such scales have variable results in response to temperature change. It obviously would be desirable to have a scale wherein weights over relatively wide ranges may be determined and still obtain a high degree of reliability, economy, and durability despite changes in ambient temperature.

SUMMARY OF THE INVENTION

A system has been conceived that includes a transducer which utilizes the principles from Fresnel's equation and Snell's law. The transducer is further based on the principle that there are prisms made of optical materials which will have a change in their index of refraction upon a load being applied to such a prism, this causing the well-known phenomenon of birefringence. In combination with the previously mentioned principles, such prisms may be utilized for determining a load that is applied thereto and thus obtain a reliable method determining the weight of an object. More specifically, such an optical scale has particularly unique advantages in measuring small weight increments in an overall wide range of weights with a large signal being received in response to a small thrust. Such prisms will also experience a change in index of refraction as a result of temperature changes. By combining prisms in a given manner, the affect in change of temperature can be minimized.

BRIEF DESCRIPTION OF THE DRAWINGS

FIG. 4 is a plan view of a system for compensating for the change in index of refraction as a result of temperature change.

DETAILED DESCRIPTION OF THE PREFERRED EMBODIMENT

Figure 1:
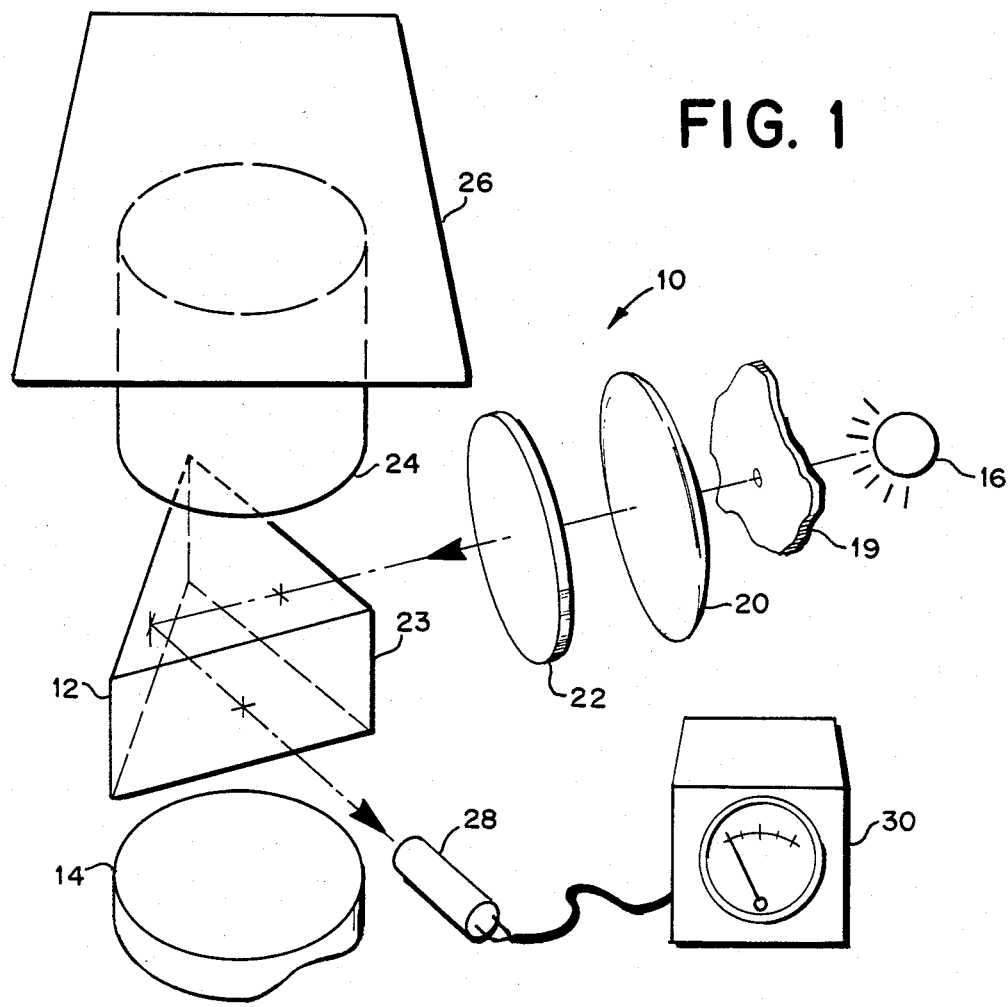
FIG. 1 shows a partially exploded, perspective view of an optical scale made in accordance with the instant invention.

Utilizing an optical transducer for the purpose of measuring a thrust and compensating for change in ambient temperature will be described in its application to a weighing scale. Referring to FIG. 1, an optical scale is shown generally at 10 and includes a first prism 12 that is mounted on a support 14. A light source 16, preferably white light, is adjacent to an aperture 19 and a collimating lens 20 addresses the aperture. Located intermediate the first prism 12 and the lens 20 is a polarizer 22. The light in this preferred embodiment will be described as being polarized in a direction parallel to the plane of incidence, but it will be appreciated that the same principles would apply for light polarized in the perpendicular direction. The prism 12 is positioned on the support 14 to allow an incoming beam of polarized light 23 to be directed upon one face thereof. The light 23 will be internally reflected at the hypotenuse of the prism 12 so that it exits out of the other face of the prism. A post 24 supports a platform 26, the post 24 resting upon the prism 12. Although shown exploded in FIG. 1, it will be appreciated that the post 24 bears upon the prism 12 and the prism in turn rests upon the support 14. It will be appreciated that the prism 12 is under stress from the thrust of the post 24 and platform 26 but this rest position will hereinafter be considered as the prism having no load thereon. A photosensor 28 is located at the position where the beam of light 23 will exit the prism 12 and is in electrical connection with a gauge 30. The gauge 30 is one which will measure the voltage generated within the photosensor 28 by the light beam 23 incident upon it thus indicating the intensity of light internally reflected from the hypotenuse of the prism 12.

Figure 2:
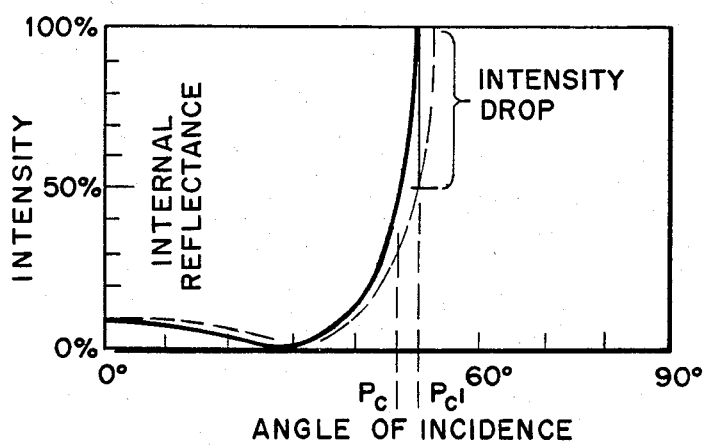
FIG. 2 is a graph showing the affects of angle of the incidence on intensity of light internally reflected by a prism.
Figure 3:
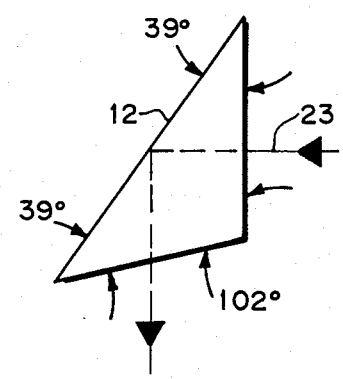
FIG. 3 is an example of a prism that may be used in carrying out the instant invention.

A prism 12 may be constructed from material such as polycarbonate plastic or glass. Referring now to FIG. 3, the critical angle of a prism 12 made of polycarbonate plastic is 39°. The index of refraction (n) for that material when not under stress is 1.586. Based upon the formula $P_c = \sin^{-1}(1/n)$, the critical angle can be computed to be 39°; when the prism 12 is under stress, its index of refraction changes to a new value $n_s$. Consequently, as shown in FIG. 2, the reflectance from the surface of the hypotenuse in a prism 12 is different when a thrust is applied to the prism than when a thrust is not applied if the angle of incidence is constant. This is particularly pronounced if the angle of incidence lies just under the critical angle. Although the change in reflectivity is more pronounced just below the critical angle than it is substantially below, and it is preferable to work in this range, it will be appreciated any part of the curve in FIG. 2 may be utilized. This change in reflectivity is detected by the photoreceptor 28 and the gauge 30 indicates the changes in terms of intensity. The intensity is determined in accordance with the formula:

$$r_P = \frac{\tan^2[P - \sin^{-1}(n \sin P)]}{\tan^2[P + \sin^{-1}(n \sin P)]}$$

where
$r_P$ is the reflectance for the light vibrating parallel to the angle of incidence
P is the internal angle of incidence on the hypotenuse, and
n is the instantaneous value of the index of refraction In FIG. 2, a graph of the effect on light intensity for polarized light, vibrating parallel to the plane of incidence, as it is reflected from the hypotenuse of a prism 12 having an index of refraction of 1.586 when the prism has no load thereon is shown. When a weight is placed upon the platform 26 a load will be transmitted through the post 24 and a stress applied to the prism 12. This stress will result in a different index of refraction and a resulting different critical $P_{c'}$. As a consequence, the intensity of light as seen by the photosensor 28 will change since it is no longer receiving the maximum amount of light reflected from the prism 12, i.e., less light will be reflected from the hypotenuse and a greater percentage will be refracted. As seen in FIG. 2, one would be able to measure a weight placed upon the platform 26 by the change of intensity of light in accordance with the curve. If the photosensor 28 is placed in such a position as to receive the light reflected from the hypotenuse when the angle of incidence is at the critical angle, it will have a certain intensity, which will be approximately 92% of intensity of the incoming light. As a load is applied, the curve shifts, either to the left or right, depending upon the affect on index of refraction of the material, and a change in intensity of light occurs. This is because the angle of the prism remains constant but it is no longer the critical angle once a load is applied to the prism. Through empirical methods the relationship between the change in light intensity and the weight applied to the platform may be determined.

As is known, the index of refraction of a prism 12 may be increased or decreased upon a thrust being applied thereto. This is dependent upon whether the prism exhibits a positive or negative change of index of refraction. In the example given above, it was assumed the prism exhibited a positive index change but it will be appreciated that the same principles apply to a prism that exhibits a negative change. In the application, one would start at a lower location on the curve shown in FIG. 2.

Referring now to FIG. 4, a system is shown for minimizing the affects on the scale 10 shown in FIG. 1 of a change in ambient temperature. As seen in FIG. 4, two additional prisms 32 and 34 are included in the scale, these prisms can be made of the same material as the first prism but it will be appreciated that different materials for one or both may be used. It will be understood that if the same material is used, the system will be completely athermal for all values of temperature; while if prisms 32 and 34 are made of a different or different materials, the system will be relatively athermal over a smaller useful range. The second prism 32 is placed between the polarizer 22 and the first prism 12 and the third prism 34 is located between the first prism 12 and the photosensor 28. Prisms 32 and 34 also comprise a single parallel plate but with an airspace in between. The angles of the prisms 32 and 34 are selected such that virtually all the light incident thereon will pass through. Prisms 32 and 34 are not put in compression. The net effect is that a change in temperature only displaces the light rays by a slight amount. Temperature compensation is caused by choosing the apex angle and material of the prisms so that prism 32 deviates the rays an additional amount, caused by a change in temperature such that the rays remain at or near the new critical angle which is caused by the same change in temperature. The effect will keep the reflectivity constant over a change in temperature. After reflection from the reflecting surface, the rays exit from the compressive prism 12 and exits from prism 34 in the same relative direction as before the temperature change. The principles above, of course, apply to the case of thermal equilibrium only.

What is claimed is:

1. An optical transducer comprising:
  a first prism, means for directing light to said first prism, a second prism intermediate said first prism and said light directing means, said second prism being oriented to receive light from said light directing means and transmit the light toward the hypotenuse of said first prism, means for measuring the intensity of light internally reflected from the hypotenuse of said first prism and a third prism intermediate said first prism and said light intensity measuring means, said third prism being oriented to receive light reflected from the hypotenuse of said first prism and transmit the light to said light intensity measuring means.

2. The optical transducer of claim 1 wherein said prisms are triangular and are constructed so that the angles adjacent their respective hypotenuse are substantially at the critical angles.

3. The optical transducer of claim 2 wherein said means for directing light directs light through said second prism to one side of said first prism, the light is reflected from the hypotenuse of said first prism, exits out the third side of said first prism and passes through said third prism.

4. The optical transducer of claim 3 when said means for measuring light intensity is located to receive substantially the maximum intensity of the light reflected when said first prism is unstressed.

5. The optical transducer of claim 1 wherein said first prism, said second prism and said third prism are all made of the same material.

6. The optical transducer of claim 1 wherein said second prism and said third prism are not made of the same material as said first prism, and said second and said third prism are made of different materials.

7. In a method of compensating for change of ambient temperature of a prism used in an optical scale, the steps comprising:
  supporting a first prism, selectively applying a load to the prism to create a thrust, directing light to one face of the first prism toward the hypotenuse of said first prism, placing a second prism between the directed light and the first prism in an orientation so that the light passes through said second prism toward the hypotenuse of said first prism, passing the light internally reflected from the hypotenuse of the first prism to a third prism, orienting the third prism to receive the light reflected from the hypotenuse of the first prism on one face thereof and transmit the light to exit out a second face and measuring the intensity of the light after it has passed through the third prism.

* * * * *